United States Patent Office 3,817,826
Patented June 18, 1974

3,817,826
PROCESS FOR FRACTIONATED RECOVERY OF LIGNIN AND CELLULOSE FROM BARK
John Hoye, Nygard, Norway, assignor to A/S Toten Cellulosefabrik, Nygard, Norway
No Drawing. Filed Sept. 20, 1972, Ser. No. 290,510
Claims priority, application Norway, Sept. 23, 1971, 3,521/71
Int. Cl. C07g 1/00; D21c 5/00
U.S. Cl. 162—93                8 Claims

ABSTRACT OF THE DISCLOSURE

Lignin and cellulose are recovered from bark. The bark is subjected to a two stage chemical treatment, the first stage comprising extraction of the lignin component with an alkaline liquid and recovery of the lignin from the alkaline extract solution, and the second stage comprising digestion of the extraction residue whereby essentially pure cellulose is obtained.

---

Due to the recent development which involves barking of logs on industrial areas it has become a great problem to get rid of the bark or to utilize it in an economical manner. Several uses of bark as such have recently been suggested such as conversion of bark to soil conditioners, preparation of fuel brickets etc. But this is not a completely satisfactory utilization of the important components of the bark.

Analysis of bark from for instance pine, shows that it contains up to 60% of lignin, about 35% of cellulosic material, about 10% horn bark, knot etc., and about 4% of rosin.

Since available wood material from which cellulose can be produced is decreasing, while at the same time the consumption of cellulose fibres in the form of paper and other articles is increasing, it is very important that all available cellulose fibres are utilized. It is therefore also very important to be able to utilize the cellulose in the bark. Of similar importance is the utilization of the lignin in the bark. Lignin is usually prepared by desulphonation of lignin sulphonate in sulphite liquor, but this is a very expensive process. Some lignin is also prepared in connection with the conversion of wood into sugar, but this will result in a somewhat condensed lignin of very limited use.

The preparation of cellulose from bark cannot take place by direct digestion of bark due to polyphenolic groups present in some of the lignin and condensing during the digestion (cf. also so-called tannin damaged wood, which cannot be subjected to digestion in ordinary manner).

From U.S. Pat. 3,328,322 and Finnish Pat. 12,636 it is known to treat bark with alkaline liquor. According to the U.S. Patent this treatment is performed to liberate bark fibres to obtain bark suitable as filler material in resin compositions. Recovery of cellulose or lignin is not mentioned. According to the Finnish Patent digestion of bark or similar waste material is carried out with caustic potash or caustic soda of a concentration of about 3–4% in a closed digester, whereafter the mass formed is freed from the liquor, rinsed and ground, and fabricated into boards and similar articles. Preparation of cellulose fibres or recovery of lignin is not mentioned.

According to the invention we have now found a new process for recovering lignin and cellulose from bark, and the process is characterized in that the bark is subjected to a two-stage chemical treatment in which in the first stage at a temperature of from 50 to 120° C., preferably from 70 to 100° C. the lignin component is extracted with an alkaline liquid, preferably sodium hydroxide, of such a concentration and in such an amount that the pH of the extract after the extraction is above 10, preferably between 11 and 12, the extraction residue is separated off, and the lignin is recovered from the alkaline extract solution in a per se known manner, for instance by evaporation or precipitation, and in the second stage the extraction residue is digested with digestion liquors known from the cellulose industry preferably on the basis of a bisulphite to give an essentially pure cellulose. A digestion liquor other than sulphite liquor which may be used, is for instance a sulphate liquor.

Lignin obtained according to the invention from bark in the form of dissolved or soluble Na-lignin has i.a. been found to have excellent dispersing properties in several systems.

The cellulose prepared according to the invention is very soft, and does normally not require any grinding, but can be used as feed cellulose, for absorbing paper or as dissolving pulp.

The first extraction of bark with alkali, which constitutes the first stage of the process, can be carried out with a sodium hydroxide solution of a concentration of 1.5–10%, preferably from 2.5–5%, the optimum concentration being 3.0% NaOH or alkali.

In general the rule is that the higher the alkali concentration used is, the faster and more complete the lignin will be dissolved at a given temperature, but by increasing the temperature it is possible to dissolve out the same amount of lignin with a lower alkali concentration. We have found that the alkali extraction can be carried out at 50–120° C., and preferably between 70 and 100° C. However, when temperatures above 100° C. are used, pressure vessels must be used for the extraction. We have also found that by increasing the temperature with 10° C., the necessary extraction time will be halved, so that while an extraction time of about 6 days is necessary at 65–70° C., an extraction time of about 22 hours is all that is necessary at 100° C. to obtain a complete dissolution of the lignin in the bark with 3% NaOH.

The use of a too high alkali concentration is unpractical for several reasons. Firstly, in spite of the filtration there will be unnecessary large amounts of alkali left in the bark or cellulose residue, which has the effect that the subsequent digestion with acidic sulphite digestion liquor takes place less rapidly and completely. At the same time the pH of the final Na-lignin product will be too high, and this will have a harmful effect on the use as dispersing agent. For use as a suitable dispersing agent, the pH of Na-lignin as measured in 1% aqueous solution, should not be higher than 10.5 and preferably somewhat lower.

On the other hand a too low alkali concentration (below 1.5–2.0%) will be unsuitable since it will bring about poor (incomplete) dissolution of the lignin and also because the low pH of the extract will have the effect that there will be a strong tendency to condensation of the lignin during the subsequent evaporation and drying. We have found that the optimum NaOH concentration is 3%, and that the optimum temperature is 100° C.

The ratio of dry bark material: the total amount of liquid and water is suitably 1:5–1:9, particularly 1:7, which means that for 100 g. dry bark material a total of 700 g. of water are present, including the water present in the wet bark used. With a sodium hydroxide solution of a concentration of 3%, this will be totally 21 g. of NaOH per 100 g. of dry bark material. The pH in the extract before and during evaporation should preferably not be below 11.5 in order to avoid the tendency to condensation of the lignin.

After a suitable extraction of the lignin from the bark with alkali the extract solution is filtered and washed on the filter with water, so that the extract solution is isolated to the greatest possible extent. After extraction with for instance 3% NaOH at 100° C. with the stated ratio of dry bark material/water, the extract solution will contain directly about 11% of solids, a solids content, which after filtering off the solid mass and washing decreases to about 9%. After a suitable evaporation of the extract solution, it is dried, for instance by spray drying.

The bark residue, which has been washed on the filter, and which consists essentially of cellulose, is then transferred to a suitable digester to which ordinary acidic sulphite cooking acid is added (the amount of remaining alkali after the extraction and the filtration must not be too high), and digestion is carried out in ordinary manner, for instance at 127–129° C. for about 9 hours. After the digestion has been terminated, the sulphite liquor is separated from the cellulose pulp in ordinary manner, and the liquor may be evaporated and spray dried to lignin sulphonate while the cellulose pulp is screened with as fine slits as possible, for instance 0.15 mm. The amount of material retained on the screen is usually high, and is generally about 10% of the dry bark material introduced and consists of undissolved horn bark or outer bark, knot, etc. After the screening the cellulose may be bleached in ordinary manner by (1) chlorination, (2) alkalization, (3) hypochlorite bleaching and finally (4) with chlorine dioxide ($ClO_2$). The cellulose may easily be bleached to excellent whiteness, but the total consumption of chlorine is usually of about 12% of the digested bark cellulose. The yield of bleached bark cellulose product is about 20% of the dry bark material introduced. As mentioned above the bark cellulose is typically soft and can preferably be used for absorbing paper or also as dissolving cellulose.

It is very important that the bark is as fresh as possible to obtain the best possible quality of the bleached cellulose product. In bark, which is not fresh, the cellulose present will have been more or less degraded due to the presence of cellulase-enzymes, and this will easily lead to poorer quality and a lower yield of bleached cellulose.

EXAMPLE

To 264.2 g. of wet bark from a barking drum having a content of dry material after drying of 37.85%, corresponding to 100 g. of dry bark material, and 164.2 g. of water were added 21 g. NaOH dissolved in 535.8 g. of water. This gives a total of 700 g. of water, which with the 21 g. of NaOH will give a 3% NaOH solution. The bark was extracted at 100° C. for 22 hours with occasional stirring. After terminated extraction the mass was filtered on wire cloth and rinsed. The pH in the initial undiluted filtrate was 11.80, and the content of dry material was 11%. After washing on the filter the content of dry material in the filtrate was 9.2%. Total yield of Na-lignin was about 75 g., and the yield of extracted NaOH-free lignin was about 55%. The filtrate was then evaporated on a water bath to a concentration of dry material of about 23%, and was then spray dried. The yield was as mentioned above. Experiments showed that this product has better dispersing properties in for instance china clay, chalk and carbon black etc. than sugar-free lignin sulphonate and other lignin products.

The washed bark or cellulose residue from the filter was torn up and transferred to a 430 ml. acid resistent pressure tube, and 245 g. of acidic ammonium sulphite cooking acid of the following composition were added:

| | Percent |
|---|---|
| Total $SO_2$ | 7.74 |
| Bound $SO_2$ | 1.02 |

The mass was then digested at 127° C. for 9 hours. After cooling the mass was filtered and washed on wire cloth. The yield after digestion was about 35 g. of digested dry cellulose material plus 12.2 g. of ammonium lignin sulphonate after evaporation and spray drying of the sulphite waste liquor.

At a mass consistency of about 2.0% the cellulose material was then screened on a Somerville Fractionator having 0.15 mm. slits. The material retained on the screen had a weight of 10.26 g. or 10.26% of the dry bark feed, and consisted of undissolved horn bark or outer bark, some knot, etc.

The screened bark cellulose was then bleached in the following manner at a mass consistency of 2.5%:

(1) chlorination with 2% chlorine at 20° C. for 20 minutes
(2) alkali treatment with 2% NaOH at 70° C. for 1 hour
(3) hypochlorite bleaching with 2% chorine at 44° C. for 2 hours
(4) bleaching in 2 stages with $ClO_2$ using 4% chlorine in each at 68° C. for a total of 4 hours.

The total consumption of chlorine was 12% of the digested (and screened) mass. The cellulose was easily bleached to a high whiteness of about 91 GE units.

The yield of bleached cellulose product was 20.2 g. or 20.2% of the dry bark feed.

The pulp or the cellulose was typically soft and was tested with respect to paper technical properties with the following result:

| | |
|---|---|
| Dewatering time sec | 396 |
| °SR | 81 |
| Breaking length metres | 4902 |
| Mullen | 26 |
| Tear (Elmendorf) | 24 |
| Folding number | 8 |

What is claimed is:

1. Process for fractionated recovery of lignin and cellulose from bark, characterized in that the bark is subjected to a two stage chemical treatment in which in the first stage at a temperature of from 50 to 120° C. the lignin component is extracted with an alkaline liquid of such a concentration and in such an amount that the pH of the extract after the extraction is above 10, the extraction residue is separated off, and the lignin is recovered from the alkaline extract solution, and in the second stage the extraction residue is digested with a bisulphite digestion liquor to give an essentially pure cellulose.

2. Process according to claim 1, characterized in that the first stage is carried out at a temperature of 70 to 100° C.

3. Process according to claim 1, characterized in that the extraction of the lignin component is carried out with a sodium hydroxide solution.

4. Process according to claim 1, characterized in that the pH of the extract after the extraction is between 11 and 12.

5. Process according to claim 1, characterized in that the recovery of the lignin from the alkaline extract solution is carried out by evaporation or precipitation.

6. Process according to claim 3, characterized in that the sodium hydroxide solution has a concentration of from 1.5 to 10% (based on the total amount of liquid, viz. all liquid added plus water in the bark), and is used in such an amount that the weight ratio of dry bark to the total amount of liquid is 1:5 to 1:9.

7. Process according to claim 6, characterized in that the sodium hydroxide has a concentration of from 2.5 to 5.0.

8. Process according to claim 6, characterized in that the weight ratio of dry bark to total amount of liquid is about 1:7.

(References on following page)

References Cited

UNITED STATES PATENTS

| | | | |
|---|---|---|---|
| 2,938,893 | 5/1960 | Gray et al. | 260—124 R |
| 51,810 | 1/1866 | Gorgorza | 162—193 |

FOREIGN PATENTS

| | | | |
|---|---|---|---|
| 1,879 | 8/1856 | Great Britain | 162—93 |

OTHER REFERENCES

Browning, Chemistry of Wood (1963), pp. 652–654.
Paper Trade Journal, 1057, Richter, p. 47.
Lewis et al., Industrial Engineering Chemistry, vol. 36, No. 8.
Clermont et al., Studies of Composition of Bark Utilization for Structural Boards.

LEWIS GOTTS, Primary Examiner
D. R. PHILLIPS, Assistant Examiner

U.S. Cl. X.R.
260—124A, 124 B, 124 C